A. D. COLE.
CONTROLLING LEVER FOR MOTOR VEHICLES.
APPLICATION FILED JAN. 26, 1917.
1,259,489.
Patented Mar. 19, 1918.
3 SHEETS—SHEET 1.
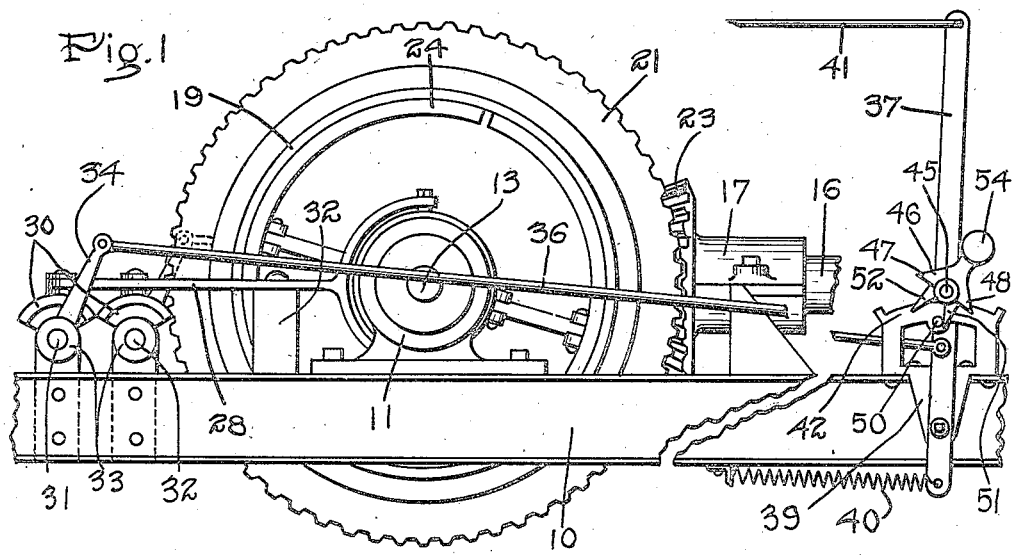
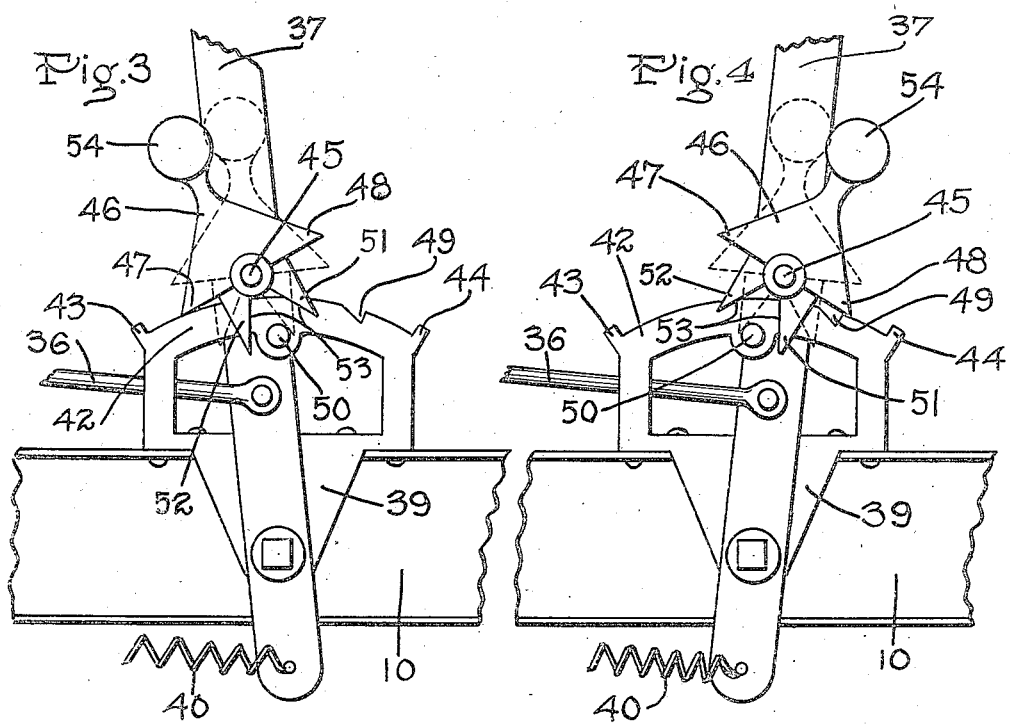
Inventor:
Arthur D. Cole
By his Attorney

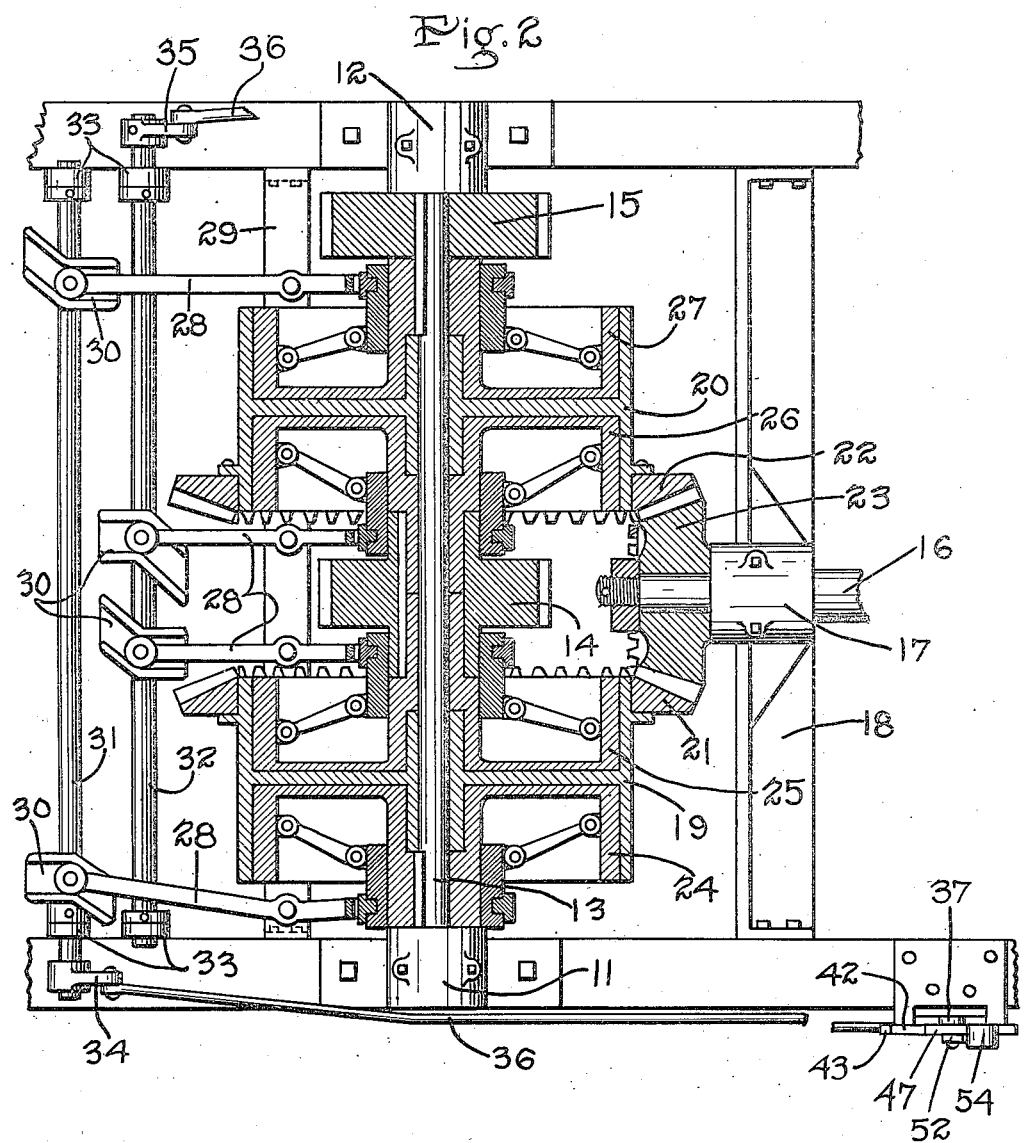

A. D. COLE.
CONTROLLING LEVER FOR MOTOR VEHICLES.
APPLICATION FILED JAN. 26, 1917.
1,259,489.
Patented Mar. 19, 1918.
3 SHEETS—SHEET 3.
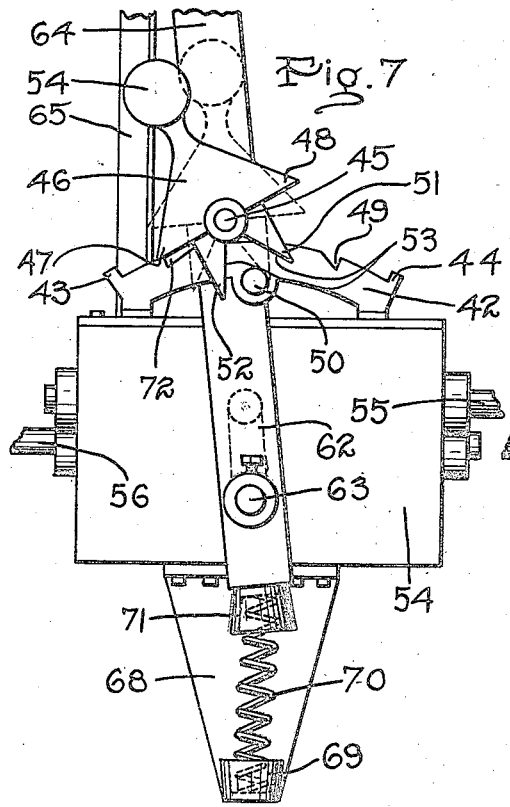
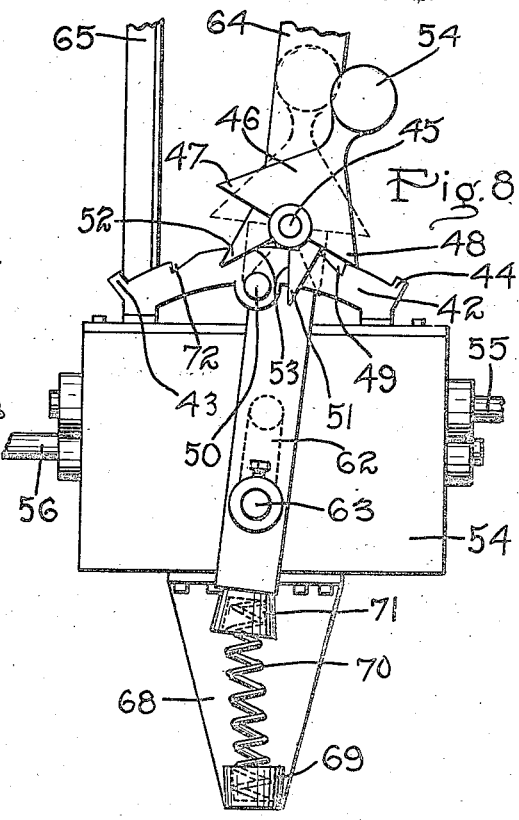
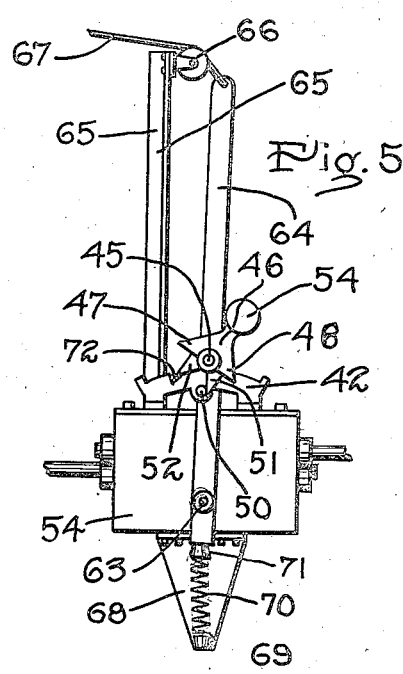
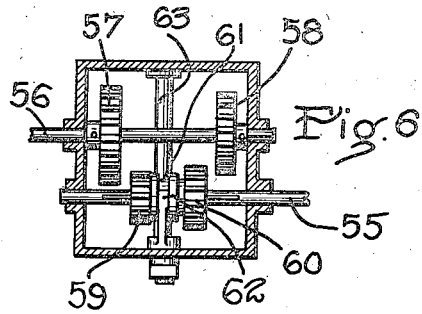
Inventor:
Arthur D. Cole
By _____
his Attorney.

UNITED STATES PATENT OFFICE.

ARTHUR D. COLE, OF TORONTO, ONTARIO, CANADA.

CONTROLLING-LEVER FOR MOTOR-VEHICLES.

1,259,489. Specification of Letters Patent. Patented Mar. 19, 1918.

Application filed January 26, 1917. Serial No. 144,627.

*To all whom it may concern:*

Be it known that I, ARTHUR D. COLE, a citizen of the United States, residing at Toronto, in the Province of Ontario and Dominion of Canada, have invented certain new and useful Improvements in Controlling-Levers for Motor-Vehicles, of which the following is a specification.

My invention relates to controlling levers for motor vehicles and has for an object to provide in conjunction with a lever for shifting gears or operating clutches, a locking mechanism whereby the lever may be controlled from a distance by a single flexible connector or rein to throw the lever in any of its operating positions and to hold it locked in any of said positions.

The full objects and advantages of my invention will appear in connection with the detailed description thereof and are particularly pointed out in the claims.

In the drawings, illustrating the application of my invention in one form,—

Figure 1 is an elevational view of a transmission mechanism for tractors showing the application of my invention thereto. Fig. 2 is a horizontal sectional view of the device shown in Fig. 1. Figs. 3 and 4 are enlarged detail views of the operating lever shown in Fig. 1 with the parts in relatively altered positions. Fig. 5 is an elevational view of a different form of transmission mechanism with my invention applied thereto. Fig. 6 is a horizontal sectional view of the parts shown in Fig. 5. Figs. 7 and 8 are views similar to Figs. 3 and 4 of the operating lever and locking device in different relative positions.

In Figs. 1 to 4, inclusive, my invention is shown as applied to a transmission device in which either of the tractor wheels may be independently or simultaneously driven either forward or backward to steer the tractor. A frame 10 carries bearings 11 and 12 in which is journaled a shaft 13 supporting gears 14 and 15 each of which drives a wheel of the tractor in the usual manner. A shaft 16 journaled in a bearing 17 secured to a crossbar 18 connected to the frame 10 is driven from the engine of the tractor and drives the gears 14 and 15 in a manner to be presently explained. Upon shaft 13 is loosely mounted two double-rimmed drums 19 and 20 which have bevel gears 21 and 22 secured thereto and which are driven in opposite directions by these gears through a bevel pinion 23 fast on shaft 16. Within the rims of these drums are mounted clutches 24, 25, 26 and 27 which may be operated by a number of shift rods 28 all pivoted on a transverse support 29 secured to frame 10. Both of the clutches 27 and 24 are secured to shaft 13 as well as the gear 15, so that when either of these clutches are thrown into engagement with the respective drums 20 and 19 said gear is caused to rotate in either direction, thus driving the wheel geared to it either forward or backward. In a similar manner gear 14 is secured to both clutches 25 and 26 so that when either of these clutches is thrown into engagement with the corresponding drums 19 and 20 said gear will rotate in either direction and cause the corresponding driving wheel to travel in either a forward or rearward direction. Levers 28 are shifted by a number of cams 30 mounted on two rock-shafts 31 and 32 journaled in bearings 33 secured to the frame 10, which cams are so constructed and arranged upon shafts 31 and 32 as to cause the corresponding wheel which said shafts control to travel in opposite directions when the corresponding shaft is rocked in its extreme positions, and to remain on neutral when said shaft is in its midway position.

Upon opposite ends of shafts 31 and 32 are rigidly secured upright arms 34 and 35 by means of which these shafts are rocked. These arms are connected by links 36 with operating levers 37 which extend upward and which are pivoted to depending castings 39 secured to frame 10, said points of pivot being below the points of attachment of the links 36 thereto. The extreme lower ends of levers 37 extend below their points of pivot and are connected by springs 40 to the frame 10 so that they normally hold the forward-running clutches in driving engagement. To the tops of levers 37 are connected rearwardly-extending flexible cords or reins 41 by means of which said lever may be oscillated. By pulling on said reins the direction of travel of each of the wheels may be reversed and control of the tractor effected therethrough from a remote position.

To lock the lever 37 in its neutral position the following device is used. A segment 42 provided with end stops 43 and 44 is formed on casting 39 and surrounds lever 37. Upon said lever immediately above segment 42 is pivoted at 45 a casting 46 which has a weighted head 54 and a pair of ears 47 and 48 extending outwardly in line with said pivot, which ears may alternately ride upon the periphery of segment 42 as the lever is oscillated. The ear 48 is adapted to fall in a notch 49 in one side of segment 42 to lock the lever in neutral position, as is clearly shown in Fig. 1, while ear 47 rides freely on its portion of the segment. In the center of segment 42 below the outer periphery of the same is secured a peg 50 which is adapted to engage a pair of arms 51 and 52 having flat cam surfaces 53 for the purpose of throwing casting 46 on either side of its dead center.

The operation of the device is as follows: In the locked neutral position the parts of the device are located as shown in Fig. 1. Here ear 48 engages notch 49 and arm 51 is positioned with its cam surface 53 in direct contact with peg 50. As the lever 37 is oscillated against the action of spring 40 casting 46 is oscillated relative to lever 37 in the same direction as said lever, due to the action of peg 50 on arm 51, said casting approaching the position shown in dotted lines in Fig. 3. Here the weighted head 54 is out of vertical alinement with the point of pivot 45 of casting 46 and hence falls by gravity, bringing said casting into the position shown in full lines in Fig. 3, said position being determined by the engagement of arm 47 with the periphery of segment 42. Lever 37 can now be drawn back to throw in the reverse clutch or the same can be released to neutral position without moving casting 46. If rein 41 is further slacked, so that spring 40 draws the lever 37 farther ahead, the cam surface 53 on arm 52 will engage peg 50, oscillating casting 46 relative to lever 37 until it reaches the position shown in dotted lines in Fig. 4, when the head 54 is past dead center in the opposite direction and drops, causing the ear 48 to engage the periphery of segment 42 and casting 46 to take the position shown in full lines in Fig. 4. Notch 49, as will be noted, is so positioned on segment 42 that when casting 46 flops over to the position shown in Fig. 4 ear 48 engages a portion of the periphery of segment 42 in advance of said notch. From this position lever 37 may be advanced to throw in the forward clutch and may again be brought back to neutral without oscillating casting 46. Referring again to Fig. 4, it will be noted in the full-line position of said casting that arm 51 is so constructed as to be a greater distance from peg 50 than ear 48 is from the edge of notch 49. In locking the lever 37 in neutral position the same is drawn back against the action of spring 40 just sufficiently to permit ear 48 to drop into notch 49, which is permitted by the above construction, when casting 46 again takes the position shown in Fig. 1 with arm 51 in contact with peg 50. In order to throw in the forward clutch from a locked neutral position lever 37 must first be brought to the position shown in Fig. 3 and the rein 41 then relaxed till said lever is fully advanced. Stops 43 and 44 serve to limit the extreme movement of lever 37. With this construction the reverse clutch can never be left in engagement with its corresponding driving element, as spring 40 will release it as soon as the rein 41 is slacked.

In Figs. 5 and 6 my invention is shown applied to a sliding gear speed change transmission instead of the transmission shown in Fig. 2. A casing has journaled in it an engine shaft 55 and a propeller shaft 56 spaced from one another. Upon shaft 56 are securely mounted two driven gears 57 and 58 which mesh with a pair of sliding gears 59 and 60 formed integral and splined to shaft 55. These gears may be shifted through a groove 61 by means of a shifting arm 62 which is operated by a transverse shaft 63 journaled in casing 54. Shaft 63 extends out beyond casing 54 on one side and has secured to it an operating lever 64 similar to lever 37 of the other construction.

In the form of transmission shown in Fig. 6 it becomes necessary to have the lever 64 remain set in either of its extreme positions. This is effected as follows. On top of casing 54 is secured an upright 65 to the upper end of which is attached a pulley 66 substantially over the center of pivot of lever 64. Over this pulley passes a cord or rein 67 which is directly secured to the upper portion of lever 64 near the end thereof. To the bottom of casing 54 is attached a depending casting 68 which carries a socket member 69 adapted to seat a compression coil spring 70 which acts upon a similar head 71 formed on the lower end of lever 64. Member 69 is directly under the center of pivot of lever 64 and when said lever is oscillated past its dead center in either direction said spring tends to further advance said lever in the same direction. It hence becomes evident that the lever may be brought up to a neutral position from either of its extreme positions by simply pulling on cord 67, and that as soon as the lever is brought in motion the same will easily pass dead center and move to the opposite extreme position and remain there.

The locking device employed with this form of construction is very similar to that shown in Fig. 1 and differs only in that an additional notch 72 is employed in segment 42 in which the ear 47 may lodge. This is essential in that the lever must be locked to neutral from two directions. In operation cord 67 is given first a single pull, which brings lever 64 from the position shown in Fig. 5 to that shown in Fig. 7. From this position the lever may be allowed to travel farther in the same direction by releasing cord 67, or may be brought into its other extreme position by giving the cord a second pull. When the lever 64 is locked in notch 72 through ear 47 the manipulation of cord 67 is the same, though the results produced are the reverse. In this case the free position of the lever is shown in Fig. 8, said lever being latched in neutral by pulling slowly on the cord till the latch member drops in the notch of the segment on whichever side of the same it happens to be.

The advantages of my invention are manifest. A single rein may be used to control the operating lever, thereby simplifying the tractor control. The device is positive in action and simple in construction and is easy to operate.

I claim:

1. In combination with an actuating member adapted to be moved from a normal inoperative position to an operative position, a lever for effecting such movement, a segment for said lever having a notch therein and an arcuate portion in advance of said notch, a latch member adapted to engage said segment, and means on the segment engaging said latch member for causing the same to be thrown into engagement with the arcuate portion of the segment in advance of the notch therein when the lever is being moved to its operative position, said means permitting the latch to engage the notch when the lever is drawn back again to latch the same in its inoperative position.

2. In combination with an actuating member adapted to be moved from a normal inoperative position to an operative position, a lever for effecting such movement, a segment for said lever having a notch therein and an arcuate portion in advance of said notch, a weighted member pivoted to said lever having a latch portion adapted to engage said notch and arcuate segment portion or to be retracted therefrom, and means associated with said segment engaging said pivoted member for throwing the same past its dead center from its retracted position when the lever is advanced toward its operative position so that said pivoted member will descend by gravity to cause the latching portion thereof to engage the arcuate portion of the segment in advance of the notch therein, said latch being free to engage said notch when the lever is drawn back again.

3. In combination with an actuating member adapted to be moved from a normally-inoperative position to either of two operative positions, a lever for effecting such movement, means for advancing the lever in either direction from its normally-inoperative position when the same is past dead center, and a double-acting latch member adapted to latch the lever from motion imparted to it by the advancing means in either direction, said latch being caused to be actuated wholly by movement of the lever.

4. In combination with an actuating member adapted to be moved from a normally-inoperative position to an operative position, a lever for effecting such movement, a segment for the lever having a notch therein and arcuate portions on both sides of said notch, a weighted member pivoted to said lever having oppositely-extending arms adapted to engage the segment when the weighted member is oscillated to either side of its dead center, a pair of depending cams on the member and a fixed cam member on the segment adapted to engage either of the depending cams on the weighted member for throwing the same past dead center in either direction as the lever is oscillated, the notch in the segment being so positioned that one of the arms engages the segment on the arcuate portion thereof in advance of said notch, permitting the lever to be advanced into operating position or retracted to its inoperative position to cause said arm to engage the notch to latch the lever.

5. In combination with an actuating member adapted to be moved from a normally-inoperative position to either of two operative positions, a lever for effecting said movement, a segment for the lever having two notches therein, a double-acting latching device adapted to engage either of said notches to prevent the lever from being moved toward one or the other of said operative positions from the inoperative position, and means associated with the latching device and segment actuated wholly by the movement of the lever for carrying said latching device over said notches to permit the lever to be brought into either of said operative positions.

In testimony whereof I affix my signature.

ARTHUR D. COLE.